Figure 1:
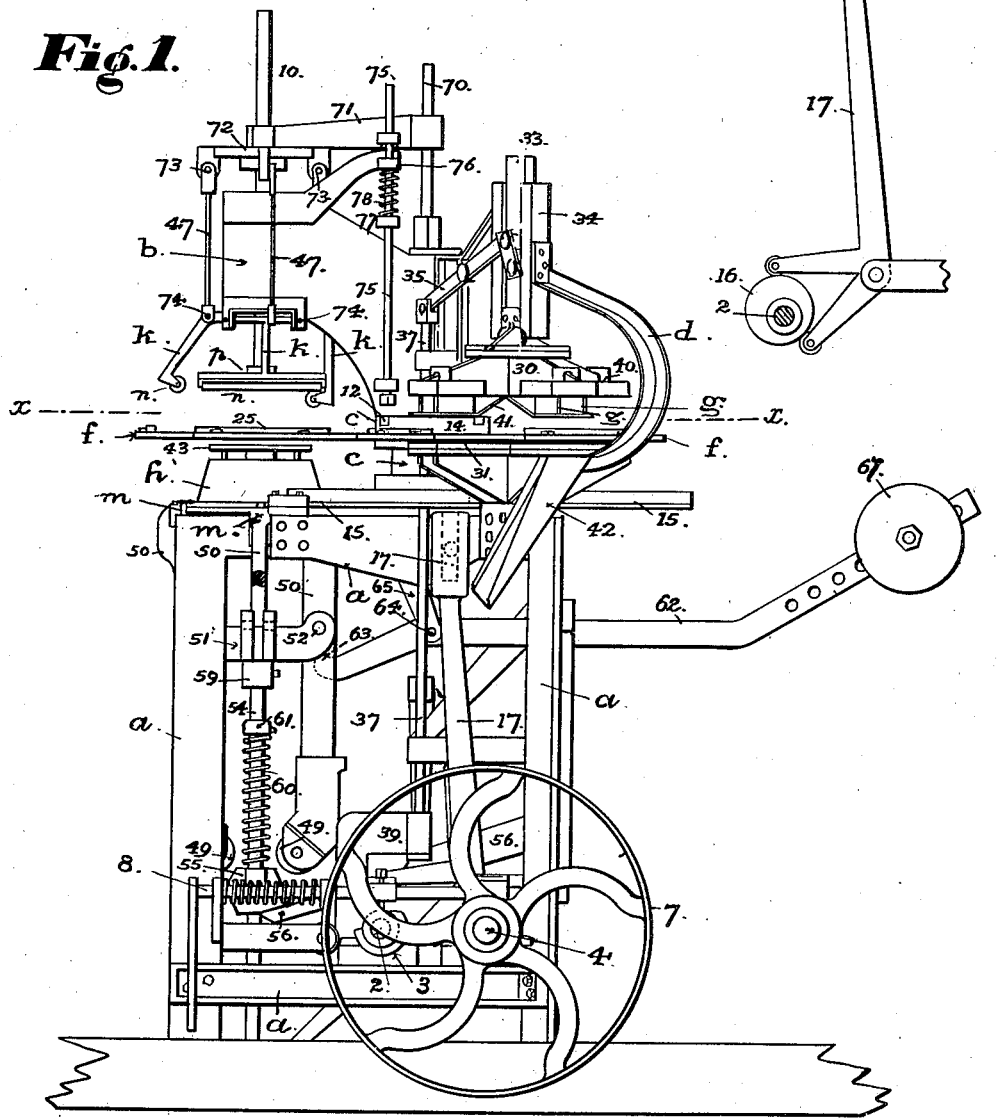

J. E. LYNAM.
MACHINE FOR MAKING FRUIT BASKETS.
APPLICATION FILED NOV. 2, 1905.

914,358.

Patented Mar. 2, 1909.
5 SHEETS—SHEET 1.

Witnesses

Inventor
Joseph E. Lynam

J. E. LYNAM.
MACHINE FOR MAKING FRUIT BASKETS.
APPLICATION FILED NOV. 2, 1905.

914,358.

Patented Mar. 2, 1909.
5 SHEETS—SHEET 2.

Witnesses.

Inventor
Joseph E. Lynam

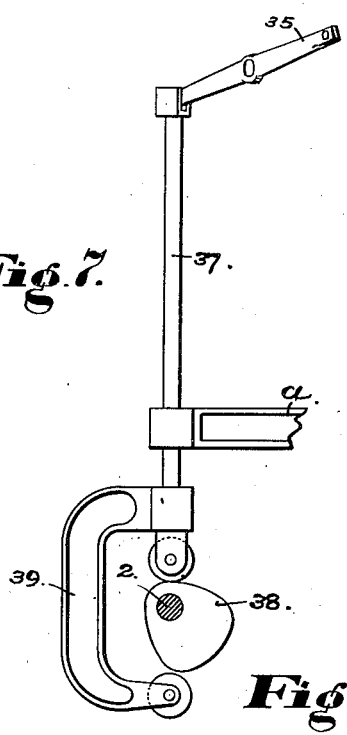

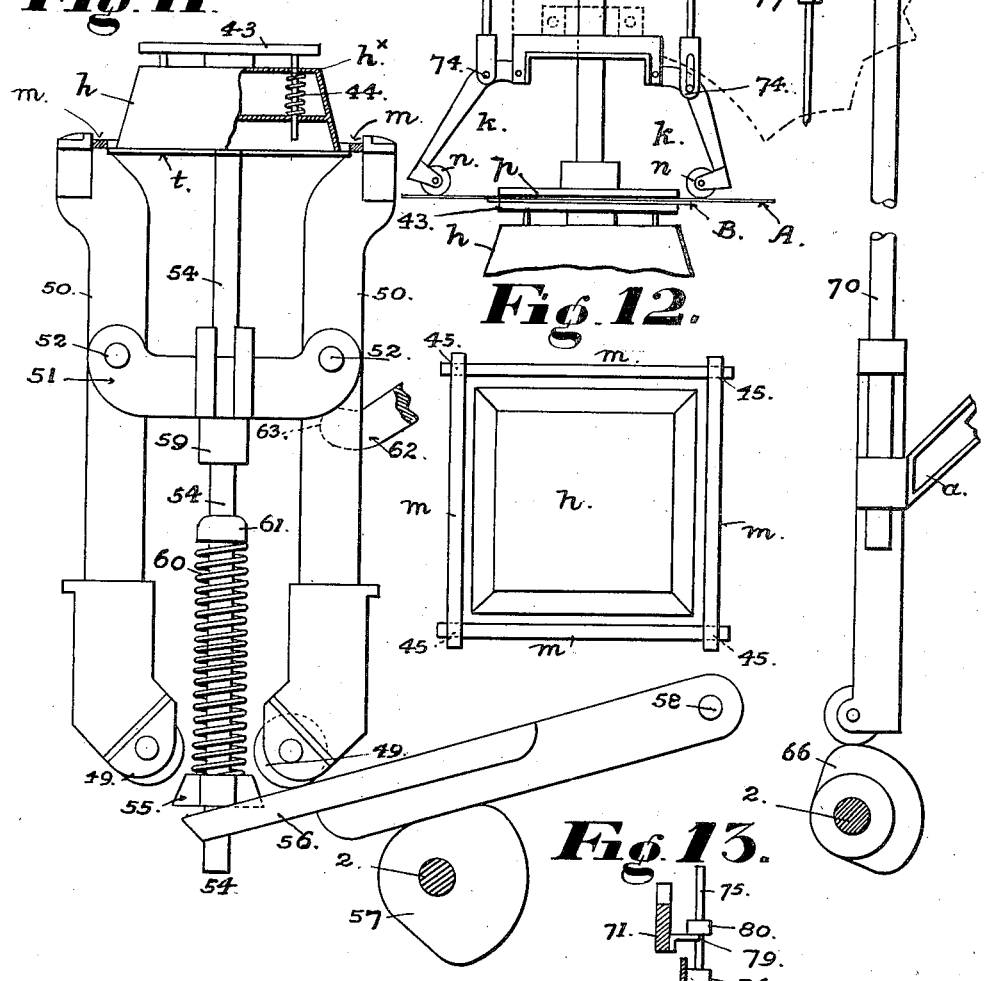

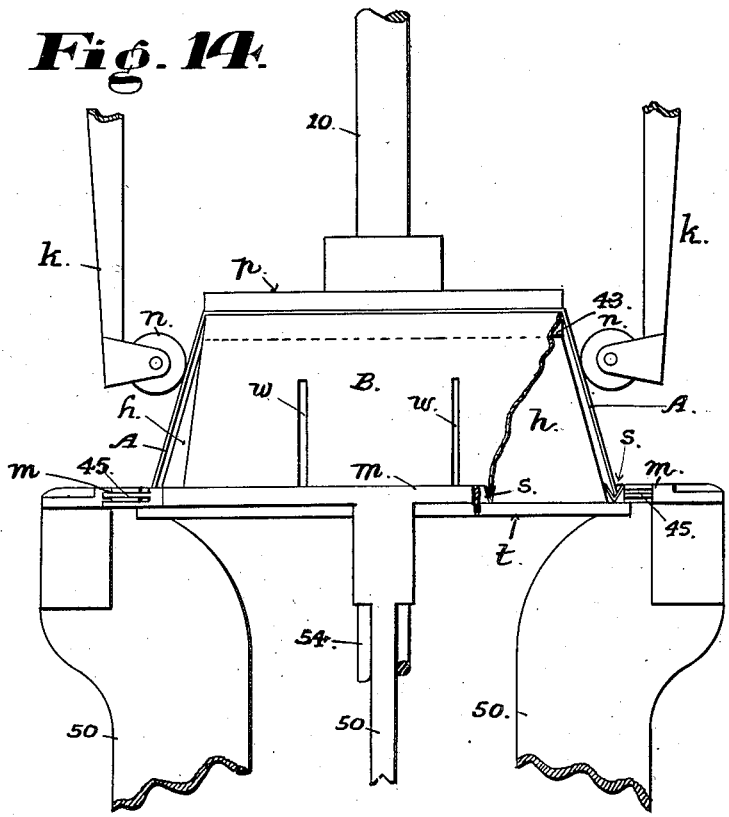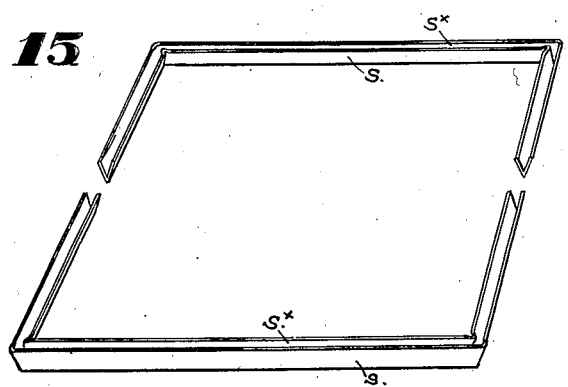

UNITED STATES PATENT OFFICE.

JOSEPH E. LYNAM, OF SAN JOSE, CALIFORNIA, ASSIGNOR TO J. LYNAM MANUFACTURING COMPANY, OF SAN JOSE, CALIFORNIA, A CORPORATION OF CALIFORNIA.

MACHINE FOR MAKING FRUIT-BASKETS.

No. 914,358.  Specification of Letters Patent.  Patented March 2, 1909.

Application filed November 2, 1905. Serial No. 285,513.

*To all whom it may concern:*

Be it known that I, JOSEPH E. LYNAM, a citizen of the United States, residing at San Jose, in the county of Santa Clara and State of California, have invented new and useful Improvements in Machines for Making Fruit-Baskets, of which the following is a specification.

This invention relates to a machine for forming fruit-baskets from veneers of soft wood and binding their tops with metal, after the manner of making baskets at the present time to carry grapes and other small fruits to market.

The object of the invention is to produce a machine for turning out complete, metal-bound baskets in a rapid manner and having the capacity for producing the same in such large quantities that they can be furnished to the consumer at a reasonable cost.

To such end and object chiefly, my invention comprises novel blank-folding means in combination with mechanism for placing and crimping the metal strips on the edges of the formed blanks and with means for feeding or presenting the blanks at regular intervals to the folding means and the metal-binding mechanism; also certain novel construction and combination of blank-slitting devices operating to cut slits for ventilation in the blanks coöperating with body-forming devices, that automatically bend and form the sides and bottom, and metal-crimping devices and a rotatable feed-table, producing a machine in which the blanks are successively presented to the different devices and mechanism to successively cut the ventilating apertures, bend the blanks to shape and bind the edges of the formed basket.

The invention embraces further certain novel parts and combination of parts producing a machine that automatically bends the blanks to shape and fixes a metal binding around the top edges by successive steps or operations that permit one blank or set of blanks after another to be fed in at regular intervals to the operating mechanism, all as hereinafter fully described and pointed out in the claims at the end of this specification.

The accompanying drawings herein referred to represent the construction of a machine embodying my said invention, and in which the blanks being introduced at intervals by the workman are bent to shape, and the metal binding applied by the different mechanisms, all actuated from a continually rotating shaft.

Figure 2:
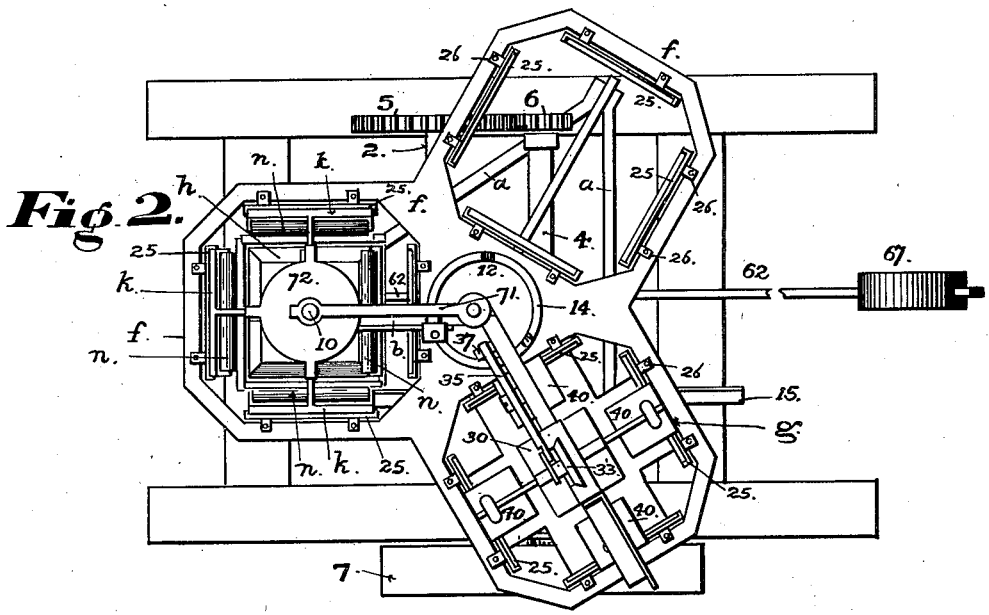
Figure 3:
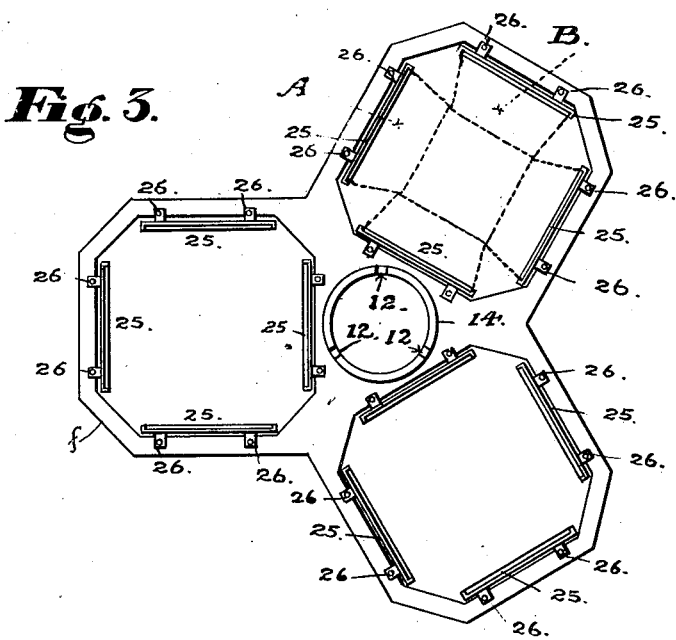

Figure 1 is an elevation of the machine taken from the right side where the operator stands to control the work. Fig. 1½ is a detail of the parts that give movement to the blank-carrier. Fig. 2 is a plan or top-view of the parts that are situated below the horizontal line $x$—$x$ Fig. 1; the head of the stationary frame and all the parts supported from it over the rotatable blank-carrier being removed above that line. Fig. 3 is a plan of the rotatable blank-carrier, in which the dotted lines indicate one set of blanks in position as they are placed by the workman who introduces the blanks to the machine at that side of the carrier. Fig. 4 is an elevation, on an enlarged scale, of parts of the rotating mechanism that moves the blank carrier around intermittently and prevents any backward rotation thereof. Fig. 5 is a side-view of the parts shown in Fig. 4, taken from the right side thereof. Fig. 6 is an elevation of the slitting table, the knives and their operating mechanism. Fig. 7 is a detail of the parts that operate the slitting knives from the principal rotating shaft of the machine. Fig. 8 is a top view of the stationary slitting table under the knives and beneath the blank-carrier. Fig. 9 is a detail of one of the knives in the slitting mechanism. Fig. 10 is an elevation, on an enlarged scale, of the folding mechanism and the platen between which and the former the blanks are gripped and held during the operation of bending them over the former. Fig. 11 is an elevation, on an enlarged scale, of the former, the metal-crimping jaws, and the mechanism that brings the former into working position and operates the jaws. Fig. 12 is a plan of the former and the crimping jaws. Fig. 13 is a detail of the locking device for holding the rotating blank carrier. Fig. 14 is an elevation, on an enlarged scale, of the "former", the folding-devices and the crimping-mechanism. Fig. 15 is a detail of the metal strips for the rim of the basket.

In the lower part of the stationary frame $a$—$a$ the horizontally-set shaft 2, supported in boxes 3, receives continuous motion in one direction from a power-driven shaft 4, through a gear 5 on one and a pinion 6 on the other. The shaft 4 has a pulley 7 to take a belt from a line-shaft pulley convenient to the machine.

All the moving parts are actuated from the shaft 2, and while that shaft is always in gear with the driver, provision is made for throwing on or off the power at any moment by connecting the shaft 4 with the driving-pulley 7 through the medium of a clutch connected with a pedal-piece, or foot operated rod 8 of any well-known construction. The principal parts actuated from the shaft 2 are, the rotatable carrier $f$; the knives $g$; that cut the ventilating slits into the blanks; the parts that bend the blanks and bring them to shape upon the former $h$, consisting of the swinging arms $k$; and the crimping-jaws $m$ which fix the metal binding-strips on the edges of the basket. The parts above the rotatable-carrier $f$ are supported by the head $b$ of the stationary frame that is itself carried by a central post $c$ and a curved brace $d$. The post forms the center of rotation of the carrier $f$, in which the blanks are placed by a workman in the position indicated by the dotted lines in Fig. 3. The blanks consist of two strips A—B of rectangular shape and equal dimensions, laid at right angles in the frame across the opening, and by the rotation of the carrier in the direction indicated by the arrow Fig. 4 are brought in succession under the knives to be cut for ventilating apertures $w$, Fig. 14, and in position over the "former", to be bent and bound with metal.

During the operation of cutting the slits the carrier is locked by a rod to engage notches 12 in the central hub 14 of the carrier; and then, as the knives are raised, the carrier is turned on its center, bringing the blanks in position between the stationary platen $p$ and the "former" $h$. While the forming and crimping mechanisms are operating, also, the carrier $f$ is stationary; and in these periods of rest the workman places in position a set of strips in the empty frame of the carrier, and the knives perform their work of cutting the slits in the blanks held in the frame next in advance.

Every time the carrier comes to rest it is locked, and the blanks in the "former" are bent to shape and the edges of the basket are bound. While a blank under the knives is being slitted and the one in the "former" is being acted on, the workman has time to place strips in the empty frame of the carrier from which the finished basket has been removed, thus regularly introducing fresh blanks to the carrier at the side where the baskets leave the machine.

Intermittent movement of the carrier is produced by the mechanism shown in Figs. 2, 4 and 5. The hub 14 of the carrier is fitted to turn loosely on the central post above a horizontal segment-gear 13 also having the same post for a center, and movable thereon with a circular reciprocating movement so as to act intermittently, first in one direction to turn the carrier forward the required distance, and then back to position for the next movement while the carrier remains at rest. A sliding rack 15 in gear with the toothed-portion of the gear 13 is moved intermittently by means of a cam 16 on the principal shaft 2 and a rocking-lever 17 to which the rack 15 is connected. The upper end of the lever and the rack 15 are connected by a slot in one and a pin in the other, and the lower end of the lever extending laterally from the center of the lever's motion is provided with rollers that engage the rim of the cam 16. A pawl 18 loosely pivoted on the rim of the segment-gear 13 engaging lugs 19 on the underside of the hub 14 causes the gear 13 to move the carrier one-third of a complete revolution in every forward stroke of the rack, and to leave the carrier at rest in the return-stroke. In each interval of rest the carrier is locked by a dog 20 loosely pivoted at 21 on the end of a bracket 22 on the stationary frame, with its longer end held up by the tension of a coiled spring 23 so as to stand in the path of the lugs 19.

In the normal position of the dog 20 it projects in the path of the lugs 19 and will arrest the carrier at the moment a lug strikes the end of the dog; but at the beginning of each rotative movement the dog 20 is depressed and held out of line with the lug 19, with which it is then in engagement, until that lug has moved past its outer end, by the rotation of the collar 14, whereupon it moves back into its normal position ready to engage the succeeding lug. The movement of the segment-gear backwardly or in one direction sets the pawl 18 behind a lug, and by the reverse movement the gear turns the carrier the required distance, thus conveying the blanks at each turn from one set of mechanism to the next. The pawl 18 at the end of the backward movement of the gear, engages with an incline 24 carried by the dog and is caused to rotate on its pivot to take a position behind one of the lugs 19. This engagement of the pawl 18 with the incline 24 has the effect to depress and hold down the outer end of the dog during the first portion of the movement of the gear 13, and until the lug next behind the one engaged by the pawl 18 has passed beyond the outer end of the dog. This takes place each time the pawl 18 is carried away from the incline 24 at the beginning of the rotary movement of the gear; but at all other times the dog is held in the path of the lugs and will engage the first one that comes against it as the segment-gear stops. The carrier is composed of three frames arranged at equal distance around the hub 14, and each one provided with angle-bars 25 secured to the four sides of the frame by ears 26 on the back. These bars serve to support at the opposite ends the two strips of veneers A—B. Before these strips are presented to the forming-mechanism they are brought under the four sets of knives where the slits for ventilation are punched or cut.

The construction and arrangement of the knives and their operating mechanism will be understood from Figs. 1, 6 and 9. The four sets of cutters, each composed of two knives $g$, are fixed in a reciprocating head 30 over a stationary bed plate 31 supported by the frame beneath, and having slits 32 to admit the knives. The head is carried by a slide 33, which is moved in guides 34 by a rocking-lever 35 connected at one end to the slide and at the opposite end connected with a vertically-movable rod 37. Movement is given at proper intervals to this rod by means of a cam 38 on the principal shaft 2. A yoke 39 on the lower end of the rod embraces the cam, which is properly shaped to move the rod in both directions, thereby bringing the cutter-head down upon the blank and raising it again. The knives $g$ are fixed in the blocks 40 on the four arms of the cutter-head, and the knives in each set work through a yielding presser-foot 41 formed of a spring-plate having slots for the knives. These parts pressing on the strips of veneer in advance of the contact of the knives hold the blanks firmly down upon the stationary table beneath while the slits are being formed, thus insuring a clear sharp cut in the strip. The strips removed by the knives are carried away by inclined chutes 42 under the slits in the stationary table.

The operations of bending the blanks to shape and afterward of fixing the metal binding around the edges of the formed basket are performed in close succession by the mechanism situated at the front of the machine where the carrier comes to rest in the second interval of rotation after having received the blank. At this point the workman is stationed, who inserts the metal strips for the binding—previously bent into a channeled form in a special bending machine— and who also removes the finished basket from the machine before the next movement of the carrier takes place. The construction and operation of that part of the machine herein termed the forming-mechanism will be understood from Figs. 1, 2, 10, 11, 12 and 14, in which a stationary platen $p$ is supported from the head $b$ of the main frame directly over the "former" $h$ over which the blanks A B are brought into position by the carrier. This part of the machine termed the "former", on which the basket is brought to shape in an inverted position, is composed of the body $h$ having four inclined sides, and a yielding top-plate 43 supported on springs 44 above the top-rim of the body so as to yield when the "former" in its upward movement is pressed against the platen. Between these two parts—the top-plate and the platen— the two strips composing the blank are clamped and held in place while the folders $k$ bend down the strips over the inclined sides of the former-body, and at the end of that operation the upward pressure against the platen causes the top-plate to seat on the top-rim $h^\times$ of the former-body. The effect of this yielding movement of the top-plate is to set the ends of the downwardly-turned strips A—B into the groove $s^\times$ of the metal strips $s$ that are previously laid in position between the former-body and the surrounding crimping-jaws to form the metal rim of the basket. The extent of vertical movement produced by bringing the top-plate and the body of the former $h$ together is sufficient to place the metal strips in position upon the edges of the basket ready for the crimping operation. It should be mentioned that the metal strips are bent in a separate machine to the shape represented in Fig. 15, and are placed in position as shown in Fig. 14, in the intervals of rest when the "former" is not moving, and after the folders having operated hold the downwardly-bent sides of the basket in place. The crimping-jaws are straight bars $m$ on the ends of four upright levers 50 that are carried by a vertically-movable bracket-piece 51 in the frame of the machine beneath the "former", and on pivotal points 52 in that bracket are caused to move inward at their lower ends.

The adjacent ends of the bars $m$ intersecting at each of the four angles are slotted from the ends a short distance longitudinally of the bar—as seen at 45, Fig. 14—to let each bar cross and work in the slots of the other; the whole set forming a rectangular frame surrounding the lower rim of the former $h$, and capable of being contracted in its dimensions equally on all four sides by spreading apart the lower ends of the levers, so as to pinch the metal strips between the sides of the "former" $h$ and the bars $m$. A central rod 54 forms a support for the "former" $h$, which is fixed on its upper end, and this rod passing through the center of the bracket-piece 51 also supports and carries that part. The lower end of the rod 54 passes through and works loosely in a block 55 having inclined faces standing in line with the lower ends of the four levers; and the block resting on the outer end of an oscillating lever 56 is raised and lowered by the movements of that lever produced by the cam 57 on the principal cam-shaft 2. The lever 56 is loosely attached to a fixed point 58 on the stationary frame, and extends over and rests upon the cam 57. A fixed collar 59 on the rod supports the bracket, and a coiled spring 60 interposed between a stationary collar 61 on the rod 54 and the block 55 supports the "former" $h$ and the bracket-piece 51. The same cam and lever raise and lower the "former" $h$ and also operate the crimping-jaws through those parts in the following manner:—By the upward movement of the lever 56 the block 55 is raised with an extent of movement sufficient to bring the top-plate against the platen $p$, thereby clamping the basket-strips A—B between those two parts and holding them in position for the folders to act. Then by the continued upward movement of the lever 56 the inclined sides of the block 55 are forced between the lower ends of the levers 50, with the effect to spread them apart and press the crimping-jaws inward against the metal strips. In this upward movement of the block the spring 60 acts to lift the rod 54 and bring the top-plate of the former $h$ against the platen; but after the resistance to such vertical movement offered by the platen $p$ the block is permitted to slide on the rod under the compression of the spring 60 and spread the levers.

The operation of fixing the metal strips follows closely upon the movements of the folders, and as the latter come to rest and the top-plate 43 is pressed against the rim of the former-body, the four jaws simultaneously close with pressure against the metal strips and immediately open to release the basket. Rollers 49 are provided on the ends of the levers 50 to reduce frictional resistance between the levers and the blocks 55, and the weight of the "former" $h$ and other parts carried or supported by the rod 54 is counter-balanced by a weight 67 on the outer end of a lever 62 having its inner end 63 extending under the bracket-piece 51, and its fulcrum 64 in a hanger 65 on the frame between the two ends.

The four folders $k$ are operated simultaneously from a single cam 66 on the principal shaft by the upright rod 70, an arm 71 fast on the rod, and a cross-head 72 fitted to slide on the rod 10 that carries the platen $p$. A link 47, pivotally attached to the cross-head at 73, is connected at 74 to the folder-arm beyond the hinge where the arm is attached to the head $b$ of the frame. Each folder has a roller $n$ corresponding in length approximately to the distance across the strip which it presses against the side of the "former" $h$. In their normal position of rest the folders stand open, with their rollers about on a level with the platen $p$, as seen in Fig. 10, and from that point they close in upon the "former" as that part is projected through the carrier and raised vertically against the platen $p$. By such vertical movement the sides of the blank are first bent down, and their edges are then set into the metal strips before the crimping-jaws are closed. The operations of forming the basket and fixing the metal rim are thus performed while the rotary carrier is at rest; and in that position the carrier is prevented from turning in either direction by means of the rod 75 working in guides 76—77 on the stationary frame, and pressed down by a coiled spring 78 into engagement with the notches 12 in the standing-ring 14 on the rotary carrier. At every upward throw of the arm a stop 79 projecting from the arm strikes a collar 80 on the rod and lifts the lower end of the rod out of the notch 12, thereby unlocking the rotary carrier at the same time that the folders are opened. The return movement of the "former" thereupon takes place, and as it passes below the plane of the rotary carrier $f$, the latter makes another turn on its center to bring another blank into position. The work of placing the blanks in the rotary carrier is done by one person standing in front of that frame or section of the carrier which is situated at the left side of the machine, the intervals of rest in the rotation of the carrier giving time for setting the blanks. At the same time a second workman introduces the V-shaped metal strips between the former-body and the crimping-jaws, after the finished basket has been removed and the "former" is at rest below the plane of the carrier. From his position at the front of the machine this second operator is able to give his attention to the person feeding the blanks and to the slitting-mechanism, as well as to the parts that operate to form the basket and apply the metal rim.

What I claim as my invention, and desire to secure by Letters Patent is:—

1. A basket-forming machine comprising in combination the following elements:—a rotary carrier having three skeleton frames arranged equi-distant about its center of rotation, and supports thereon to carry the edges of the blanks; a slitting-device operating to form slits in the blanks within the edges thereof; a "former" corresponding to the shape of the basket to be formed and having vertical movement whereby it is projected through the carrier for taking the blanks therefrom; a platen above the plane of the carrier, against which the blanks are held by the "former"; means operating to bend the blanks over the "former"; and a crimping-device, operating to fix metal strips upon the edges of the formed blank by pressing the strips between the sides of the "former" and the crimping-device.

2. In a basket-forming machine, an intermittently rotating blank-carrier; a slitting-device operating to form ventilating-slits in the blank; and a basket-forming mechanism, comprising a vertically movable "former" having the shape of the inverted basket, means for alternately projecting said "former" through and lowering it below the carrier, folding-devices operating to bend the blanks upon the "former", a stationary platen against which the blanks are held during the bending operation, and a crimping-device having alternate movement toward and away from the sides of the "former", operating to fix metal strips upon the edges of the bent blank by compression.

3. In a basket-forming machine, in combination, an intermittently acting slitting device; a vertically movable "former", corresponding in shape to the inverted basket and having a flat top; a platen above the "former", against which the top of the "former" is brought in contact and held during the operation of bending the blanks; a folding-device operating to bend the blanks over the "former"; and an intermittently rotating blank-carrier having a plurality of openings over which the blanks are laid in position, means for rotating said carrier to bring the blanks in succession under the slitting-device, and in position over the "former" in every rotation of the carrier; and means for operating the cutting-device and the blank folding-device in the intervals of rest between the movements of the carrier.

4. A basket-forming machine having a vertically movable "former", a stationary platen above the "former" and with which the top of the "former" is brought in contact to hold the blanks in its upward movement, folding-devices for bending the blanks over the "former", and an intermittently rotatable carrier provided with openings and means for holding the blanks in place over the openings, said carrier being rotatable in a plane perpendicular to the direction in which the "former" moves, means for rotating the carrier in the intervals of rest between the movements of the folding-device, and a locking-device operating to prevent the carrier from turning during the operation of the folding-device.

5. A basket-forming machine having a vertically movable "former", a blank-carrier intermittently rotatable in a plane perpendicular to the travel of the "former" and provided with openings through which the "former" is projected while the carrier is at rest and means for holding the blanks in position over said openings, a stationary platen situated above the plane of rotation of the carrier, a folding-device to bend the blanks over the "former", and means for locking the carrier during the operation of the folding-device in the elevated position of the "former" and for releasing it after the "former" has returned to position below the carrier.

6. A basket-forming machine having a vertically-movable "former" provided with a yielding top, a blank-carrier rotatable in a plane perpendicular to the travel of the "former" and provided with openings through which the "former" is adapted to project in its upward movement, means for holding the blanks in position across the said openings, a stationary platen situated above the plane of the carrier for the purpose of holding the middle portion of the blanks against the top of the "former" and leaving the end-portions free, folding-devices for bending the free portions of the blanks over the sides of the "former" and means for producing vertical movement of the "former" after the contact of the blanks with the stationary platen.

7. A basket-forming machine having a vertically movable "former" provided with a yielding top, a stationary platen supported over the "former", means for introducing the blanks in position between the platen and the top of the "former", means for bringing the "former" in contact with the platen for the purpose of clamping the middle portion of the blank between said parts and leaving the ends free, folding-devices operating to close against the sides of the "former", and means for pressing the "former" upward after the folding-devices are closed, whereby there is a relative movement of the folded blank and the "former" and the edges of the blank are exposed beyond the "former".

8. A basket-forming machine having a vertically movable "former" provided with a yielding top, a platen supported above the yielding top and coacting therewith to hold the middle portion of the blank against the yielding top and leave the end-portions thereof free, folding-devices adapted to close upon the sides of the "former", and means for moving the "former" upward between the closed folding-devices after the blanks are confined between the platen and the yielding-top of the "former".

9. A basket forming machine having a vertically movable former provided with a yielding top, a platen supported above the yielding top and co-acting therewith to hold the middle portion of the blanks against the yielding top and leave the end portions thereof free, folding devices adapted to close upon the sides of the former, means for moving the former upward after the folding devices have operated, and means for binding the edges of the blanks after the basket is formed.

10. A basket-forming machine having an intermittently movable "former" provided with a yielding-top; a platen situated over the yielding-top and coacting therewith to clamp the blanks upon the top of the "former", leaving the end-portions thereof free; folding-devices adapted to close upon the sides of the "former" and operating to bend the free ends of the blanks by an upward movement of the "former" between said folding-devices; a crimping-device adapted to fix a metal rim on the edges of the folded portions of the blank, comprising crimping-bars intersecting each other at the adjacent angles and surrounding the lower rim of the "former", means for simultaneously moving said bars toward the "former", and a support for the metal strips composing the rim to hold the same in position between the sides of the "former" and the crimping bars.

11. In a basket-forming machine, the combination of an intermittently movable "former"; a stationary platen against which the "former" is pressed to clamp the blanks; an intermittently rotatable blank-carrier movable in a plane between the "former" and the platen and provided with openings through which the "former" is moved to make contact with the platen, and means for loosely supporting the blanks across said openings; a folding-device adapted to bend the blanks over the sides of the "former" in the upward movement of the "former" between said folding-devices; a crimping-device surrounding the lower edge of the "former" and movable vertically with the "former"; a support for a metal rim beneath the edges of the folded blank to hold the same between the sides of the "former" and the crimping-device; and means for successively actuating the folding-device and the crimping-device.

12. In a basket-forming machine an intermittently moving "former" having a yielding top-plate, in combination with an intermittently rotating blank-carrier movable in a plane at right angles to the movement of the "former" and provided with openings through which the top of the "former" is adapted to pass, a platen situated above the plane of the rotating blank-carrier and operating by the contact of the top of the "former" therewith to hold the middle portion of the blanks upon the top of the "former", and leave the end-portions thereof free, folders for shaping the blanks against the "former", and means for causing the movement of the top plate relative to the former, while the blank is held between the top and the former and after the folders have operated.

13. In a blank-forming machine a stationary platen, in combination with a "former" movable in a right line perpendicular to the face of the platen and provided with a yielding top-plate to contact with the platen, means for bringing the "former" against the platen to confine the blanks in position across the top of the "former", means for bending the projecting end-portions of the blanks over the sides of the "former", a support for the metal strips to form the rim of the basket, means operating to move the "former" with increased force against the platen and thereby depress the yielding top-plate sufficiently to set the edges of the blanks into the metal strips, and a crimping-device operating to compress the metal strips upon the edges of the blanks.

14. In a basket-forming machine in combination with a driving shaft, a platen, a "former" movable in a right line perpendicular to the face of the platen and provided with a yielding top-plate, means for periodically introducing the blanks between the platen and the "former", means for setting the "former" in contact with the platen to hold the blanks against the top of the "former", folding devices operating to bend the free ends of the blanks over the "former" and connections with the driving shaft independent of the former-operating means for operating the said folding devices.

15. The combination of the stationary platen, a "former" movable at right angles to the platen, means for setting the "former" against the platen and afterward imparting an additional movement in the same direction, a blank-folding device operating to close upon the sides of the "former", crimping-jaws operating to close against the sides of the "former", and means for supporting a metal rim in an uncrimped state between the "former" and the crimping-jaws.

16. The combination with a "former" of crimping-jaws having intersecting end-portions, a vertically-movable bracket-piece, levers pivotally-attached to the bracket-piece and having the crimping-jaws attached to their ends, means for operating the "former," means for closing the crimping-jaws thereon, a cam, and means operatively connecting the bracket piece with the cam to impart vertical movement to the bracket-piece.

17. The combination with the vertically-movable "former", of a crimping-frame having straight bars with slotted interlocking end-portions, the adjacent ends of said bars being fitted to slide upon each other in planes at right angles to each other, a vertically-movable bracket-piece, levers carried thereby and having the bars of the crimping-frame attached thereto, means for raising and lowering the bracket-piece, and means for spreading the levers to operate the crimping-frame.

18. In a basket-forming machine a rotatable blank-carrier, a "former" having a vertical movement perpendicularly across the plane of the blank-carrier, means for folding the blanks upon the "former" after they are taken from the said carrier, blank-slitting means located in advance of the position occupied by the "former" and adapted to cut slits in the blanks while they are held on the carrier and before they are presented to the "former" by the rotative movement of the carrier.

In testimony whereof I have hereunto set my hand hereto in the presence of two subscribing witnesses.

JOSEPH E. LYNAM.

Witnesses:
 GEO. D. SMITH,
 CHARLES CLARK.